Feb. 12, 1924.
E. H. MEDÉN
CUTTING BLOWPIPE
Filed March 18, 1920    2 Sheets-Sheet 1
1,483,467
Fig. 1.
Fig. 2.
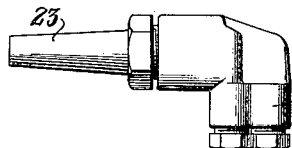
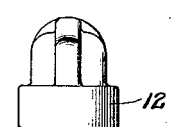
WITNESSES:
Gustav Genzlinger.
INVENTOR
Elof H. Medén
BY
Cyrus N. Anderson
ATTORNEY

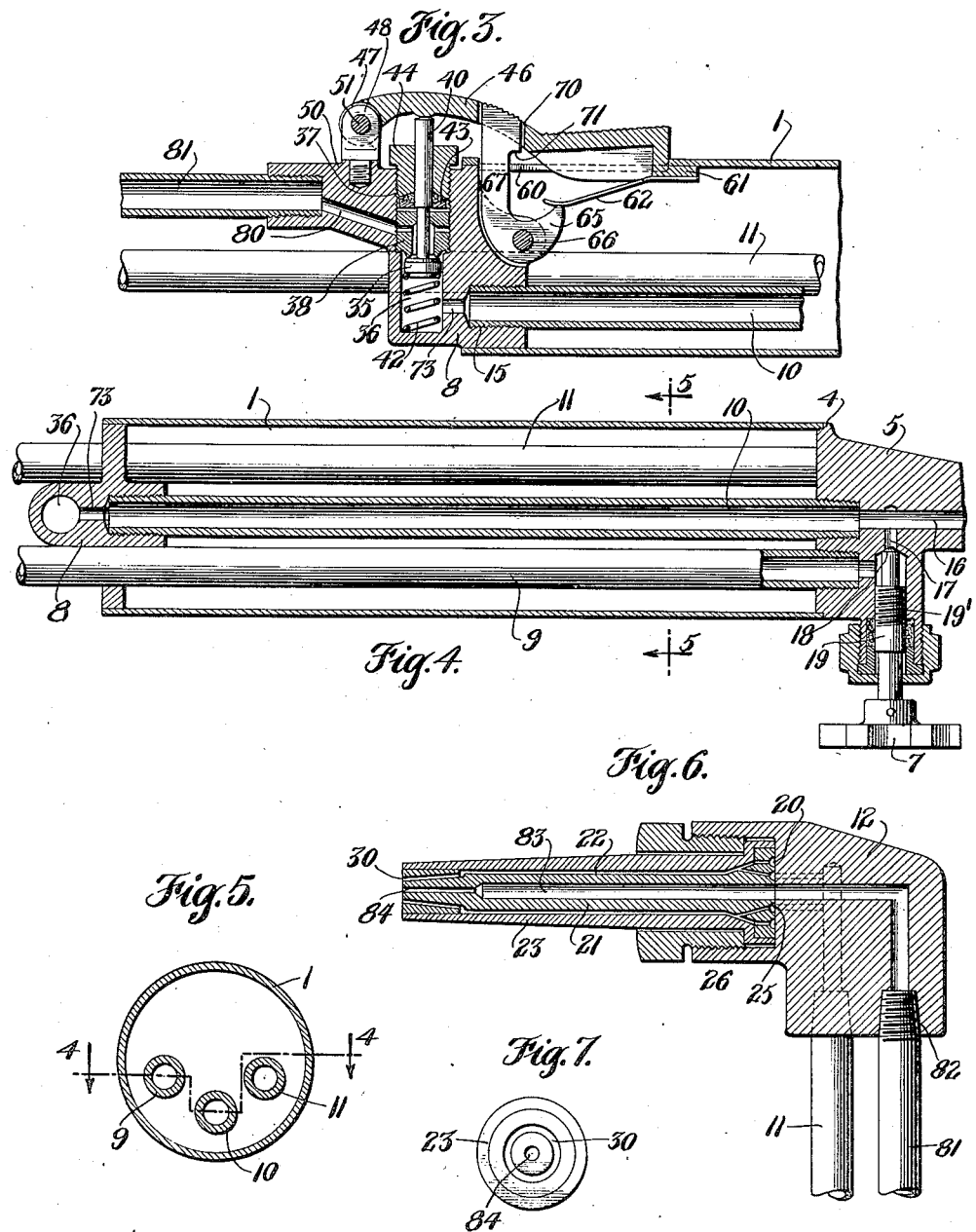

Patented Feb. 12, 1924.

1,483,467

UNITED STATES PATENT OFFICE.

ELOF H. MEDÉN, OF SHORT HILLS, NEW JERSEY, ASSIGNOR TO AMERICAN GASACCUMULATOR COMPANY, OF ELIZABETH, NEW JERSEY, A CORPORATION OF NEW JERSEY.

CUTTING BLOWPIPE.

Application filed March 18, 1920. Serial No. 366,833.

*To all whom it may concern:*

Be it known that I, ELOF H. MEDÉN, a subject of the King of Sweden, and a resident of Short Hills, in the county of Essex and State of New Jersey, have invented an Improvement in Cutting Blowpipes, of which the following is a specification.

My invention relates to cutting blow-pipes and it has for its object generally to provide a cutting blow pipe or torch which is simple in construction and which, while of light weight, is strong and durable.

In cutting blow pipes or torches of the character to which my invention relates, means is provided, as is known, for producing a heating flame for pre-heating the metallic material to be cut at the point where the cutting is to be effected and also with means whereby when the material has been thus pre-heated, a stream of oxidizing gas, oxygen, is directed against the pre-heated metal at the point and along the line where the said pre-heating has been effected. The said material having been previously raised to a proper temperature, oxidation and a cutting or severing thereof are effected.

It is therefore one of the objects of my invention to provide an improvement in the means for regulating and controlling the delivery and discharge of the oxidizing gas in a separate stream against the material to be cut after and as the same is pre-heated by the pre-heating flame.

A further object of my invention is to provide a construction in which the said controlling means is situated exteriorly of the handle by means of which the blow pipe or torch is held and guided in operative relation to the point and line at and along which a metallic object is to be cut or severed and in a position convenient for operation and manipulation, preferably by the thumb of the hand by which the handle of the blow pipe or torch is held.

After the article to be cut or severed has been pre-heated by the pre-heating flame, a valve is actuated to open a passageway through which is provided, to the tip or cutting end of the blow pipe or torch, an excessive supply or separate stream of the oxidizing gas. It is necessary that this valve shall remain open during the entire period of the cutting action. It is therefore a further object of my invention to provide means which, after said valve has been actuated to open the same, operates automatically to retain the said valve in open position.

A further object is to provide means whereby said means for holding the valve in said open position may be readily released and permitted to return automatically to its normal position with the valve controlled thereby in closed position.

A still further object of my invention is to provide a blow pipe structure of relatively great strength and stability with a minimum of lightness and also with desired simplicity of construction.

I have not endeavored to mention all of the objects and advantages of my invention, but other objects and advantages thereof will be pointed out in the detailed description thereof which follows or will be apparent from such description.

In order that my invention may be readily understood and its practical commercial advantages fully appreciated, reference should be had to the accompanying drawing in which I have illustrated one form of practical mechanical embodiment thereof. However, it will be understood that changes in the details of construction may be made within the scope of the claims without departing from the invention.

In the drawings:

Fig. 1 is a view in side elevation of a cutting blow pipe embodying my invention;

Fig. 2 is a top plan view of the same;

Fig. 3 is a longitudinal sectional view taken on the line 3—3 of Fig. 2;

Fig. 4 is a horizontal sectional view taken on the line 4—4 of Figs. 1 and 5;

Fig. 5 is a transverse sectional view taken on the line 5—5 of Fig. 4;

Fig. 6 is a longitudinal sectional view of the head and tip of the blow pipe; and Fig. 7 is a front end view of the tip.

Referring to the drawings: 1 designates a tubular handle which preferably is cylindrical in form. The rear end of the handle is closed by the forward circular end portion 4 of the valve body member 5 containing valve controlled passageways through which the gases, such as acetylene and oxygen, are delivered to the pipes which in turn are in communication with the passageways through the head of the blow pipe at its forward end and thence to the tip of the blow pipe. The valves for controlling the flow of gases through the passageways in the valve body 5 are provided with handles 6 and 7, the valve which is actuated by the former controlling the flow of acetylene or other combustible gas while the valve which is regulated by the handle 7 controls the flow or passage of the oxygen or other like gas which is mixed with the combustible gas, acetylene, at the tip end of the blow pipe and which, when ignited, constitutes the pre-heating flame. The forward end of the handle is closed by the rear end portion of a valve body member 8, as is clearly shown in the drawings. The purpose of the valve body and valve construction provided therein in front or in advance of the forward end of the handle 1 is to control the passage of the oxidizing gas, oxygen, to the tip end of the blow pipe where it is discharged as a separate stream against the pre-heated metal and effects the cutting or severing thereof. The pipes or conduits through which the gases are conducted from the passageways through the valve body 5 are three in number and designated 9, 10 and 11. Each of these pipes at its rear end has screw threaded connection with the forward end portion of the valve body 5 as is shown in Fig. 4 of the drawings. Two of the said pipes, 9 and 11, extend continuously from the valve body 1 forwardly through the valve body 8 to the head 12 at the forward end of the blow pipe. The other of these pipes, 10, terminates at its forward end in the valve body 8 and has screw threaded connection therewith as shown at 15. The oxidizing gas, oxygen, flows through the passageway 16 through the valve body 5 and is in direct alinement with the pipe 10. 17 designates a lateral branch opening or passageway leading laterally from the passageway 16. Said passageway 17 is adapted to be opened and closed by a valve 18 which is formed upon the inner end of a member 19 having screw threaded engagement at 19' with the valve body whereby, when the said member 19 is rotated by means of the handle 7 the valve 18 is adjusted toward and from its seat at the outer end of the passageway 17 to close or open the same. When the said valve is in open position the oxidizing gas is permitted to flow from the passageway 16 through the passageway 17 into the pipe 9 and thence forwardly to the head 12, from which it is discharged into the circular groove 20 in the rear end of the interior tubular member 21 of the tip secured to the head 12. From the groove 20 the said gas flows forwardly into the annular chamber 22 between the external surface of the tubular member 21 and the interior surface of the exterior tubular member 23 of the tip.

The combustible gas flows forward through the pipe 11 to the head 12 and is discharged into the annular groove 25 and thence forwardly into the elongated annular chamber 22. The oxidizing gas and the combustible gas, such as acetylene, are mixed together in the slightly converging annular chamber 26 which is situated in advance of the chamber 22. The gases are delivered to the chamber of the tip in the proportions requisite to the production of an efficient heating flame. The gases thus mixed issue from the circular opening 30 indicated in Fig. 7. A hollow cone-shaped flame is produced.

The flow of oxidizing gas, oxygen, through the pipe 10 is controlled by a valve 35 which is situated and operates in the valve body 8 in front of the forward end of the handle 1. The said valve is situated in a vertical hole extending from the top to near the bottom of the said valve body 8. The lower portion of the said hole is somewhat reduced in size as indicated at 36 as compared with the upper half portion 37 thereof, the latter being screw threaded. 38 designates a plug which is situated in the lower portion of the enlarged part 37 of the said hole, which plug has screw threaded connection with the said valve body as shown. The said plug also is provided with an opening extending vertically or longitudinally therethrough through which the lower end portion of a rod 40 extends. The said lower end portion of the rod 40 is reduced in size and the upper end portion of the hole through the said plug fits somewhat closely the reduced portion of the said rod while the remaining lower portion of the opening through said plug is of a diameter substantially greater than the diameter of the reduced portion of the said rod. The valve 35 is secured to the lower end of said rod and normally or when no oxidizing gas is flowing or permitted to flow from the pipe 10 is held in closed position against its seat on the lower end of the plug 38 by means of the spring 42 which is seated in the lower portion of the vertical hole in the valve body 8 with its lower end upon the bottom of said hole, and its upper end seated against the under side of the valve 35. Packing 43 surrounds the rod 40 above the upper end of the plug 38 and is held in position and in clamped and close contact against the said rod by means of the screw threaded plug 44 through which the upper portion of the rod 40 extends.

The rod 40, together with the valve 35 upon the lower end thereof, is adapted to be actuated by a lever 46. The forward end of the lever 46 is provided with ears 47 which are situated upon opposite sides of a projection 48 extending upwardly from the upper or top side of a projection 50 extending forwardly from the upper portion of the valve body 8. The ears 47 are pivotally connected with the projection 48 by means of a pivot 51. The action of the spring 42 upon the valve 35 and the rod 40 holds the valve in closed position and also maintains the lever 46 in the position shown in Fig. 3. The under side of the rear end portion of the lever 46 projects into a slot 60 in the top side of the forward end portion of the handle 1 and is retained in said opening by means of a projection 61 which extends rearwardly underneath the top side of the said handle immediately in rear of the rear end of the slot 60.

62 designates a plate spring the rear end portion of which is secured to the under side of the rear end portion of the lever 46. The forward end portion of the spring 62 contacts with the rearwardly and upwardly extending arm 65 of a bell crank catch lever which is pivoted at 66 upon the rear end portion of the valve body 8, the point of pivotal support of said lever being situated near the longitudinal axis through the handle 1 and through the said valve body. The other arm 67 of the said lever which is situated beyond or in front of the pivotal point 66 extends substantially vertically upward through the forward end of the slot 60 and projects through the opening 70 through the lever 46. Near its upper end the arm 67 is provided with a shoulder 71 which constitutes a catch which is adapted to engage the upper side of the lever 46 immediately in rear of the opening 70 therethrough.

It will be observed that the forward end of the pipe 10 is in communication with the vertical hole in the valve body 8 through a passageway 73. It will also be observed that with the parts in the positions shown in Fig. 3 of the drawings no gas can flow from the pipe 10. The parts occupy the position as shown in Fig. 3 both when the device is not being used and when it is being used for the purpose of pre-heating the metal of the article at the point and along the line at and along which it is to be cut. After the metal has been thus pre-heated the operator who holds the handle 1 in either hand, usually in the right hand, depresses the lever 46 by placing his thumb, usually, upon the upper side of the rear end portion thereof. Such depression depresses the rod 40 together with the valve 35 upon the lower end thereof and opens the passageway through the screw threaded plug 38 so as to permit the oxidizing gas to flow through and from the pipe 10 and through the passageway 80 into the pipe 81 which is connected as indicated at 82 to the head 12. The oxidizing gas which is delivered from the pipe 81 flows through the passageway 83 and is discharged through a relatively small passageway 84 which is situated concentrically of the annular discharge opening 30. The oxidizing gas thus discharged strikes against the pre-heated metal and by oxidation thereof effects a cutting or severing of the same in known manner. The pipes 10 and 81 with the passageway through the valve body 8 connecting the same may be regarded as together constituting the oxygen cutting conduit.

Upon the depression of the lever 46 the spring 62, the forward end of which rests upon the rear upper end of the arm 65, is tensioned so that when the said lever 46 has been depressed through a sufficient distance the catch 71 moves into engagement with the said handle as above described and holds the same in closed position until released. When it is desired that the valve 35 shall be closed the operator merely places his thumb or finger upon the upper end of the arm 67 and pushes the same rearwardly to disengage the shoulder 71 from the rear edge of the opening 70 whereupon the springs 42 and 62 operate to return the parts into the positions shown in Fig. 3, in which position the valve 35 is closed and in consequence of which the flow of gas through the pipes 10 and 81 is interrupted.

I have so combined the pipes 9, 10, 11 and 81 with the handle 1 and with the valve body 8 as to produce a very strong and stable structure.

The pipes 9, 10, and 11, within the handle 1 are located nearer to a common plane than are the pipes 9, 11 and 81 between the handle 1 and the head 12. However, the arrangement of the pipes within the handle is not detrimental to the strength or stability of the structure because the said pipes, being connected to the valve bodies 5 and 8 and the latter supporting and being connected with the handle 1, as indicated, all cooperate to produce a very strong though light structure. Beyond or in front of the handle 1 the pipes 9, 11 and 81 are arranged in triangular relation with respect to each other as is shown, in consequence of which the pipes brace and support each other in a manner to produce a rigid structure capable of resisting forces or blows tending to bend the said pipes in any direction.

It will be seen that by my construction I provide a valve structure for controlling the flow of the oxygen which is delivered to the tip in a separate stream for effecting the cutting action exteriorly of the handle so that it is readily accessible for repair. It is apparent that by removal of the pivot 51 the lever 46 may be removed and that the latter having been removed the plugs 38 and 44 may be removed, the removal of the former plug 38 effecting, in the construction shown, simultaneous removal of the rod 40 together with the valve 35 secured upon the lower end thereof.

I claim:

1. In a cutting blow pipe or torch having a handle and conduits for conveying the gases to the tip of the blow pipe, the combination of a valve body situated at one end of the handle, a valve situated in said valve body exteriorly of the said handle which valve controls the passage of gas through one of said conduits, means situated exteriorly of the said handle, and in adjacent relation thereto, for actuating the said valve, and means supported within said handle and adapted to engage the said valve actuating means and hold it in position to retain the valve in open position.

2. In a cutting blow pipe or torch provided with a handle and conduits for the passage of gases to the tip of the said blow pipe, a valve body secured to and supported by said handle, said valve body having a hole which extends part way therethrough, transversely of the length of the said handle, and constituting a portion of a passageway through the said valve body through which the oxidizing gas is supplied to the said tip for effecting the cutting operation, a valve situated in the said hole, said hole in the said valve body being situated exteriorly of the said handle, a valve stem projecting from the said valve, a lever pivoted forwardly of the outer end of said stem and extending above the end of the latter, means for normally holding the said valve in closed position and the said lever in elevated position in contact with the projecting end of the valve stem, and means pivotally supported within said handle and projecting through an opening in the side thereof and adapted to engage said handle and hold it with said valve in open position.

3. A cutting blow pipe or torch comprising in combination a tubular handle, conduits for conveying the gases to the tip of the said blow pipe or torch, a valve situated exteriorly of the said handle for controlling the flow of the oxidizing gas through the oxygen cutting conduit, a lever pivoted at its forward end in advance of the said valve, said lever extending rearwardly to a point in rear of the said valve, said lever being adapted to have pivotal movement upon its pivot and the said lever also being situated exteriorly of the said handle, and means intermediate the said lever and the said valve whereby depression of the said lever effects opening movement of the said valve, and means pivotally supported within said handle and projecting through an opening in the side thereof and adapted to engage said lever to hold it in depressed position.

4. A cutting blow pipe or torch comprising in combination a tubular handle, conduits for the gases, one of the said conduits constituting the oxygen cutting conduit, a valve body having a rearwardly extending portion which projects into the forward end of the said handle to close the same, said valve body being provided with a passageway extending therethrough which constitutes a portion of the said oxygen cutting conduit, a valve situated in the said passageway for controlling the passage of oxidizing gas therethrough, a spring situated in the said passageway for holding the said valve in closed position, a lever pivotally supported at its forward end in advance of the said valve, said lever extending rearwardly exteriorly of the said handle and having movable connection therewith, means intermediate the said lever and the said valve whereby movement of the said lever in one direction effects opening of the said valve, and means pivotally supported within said handle and projecting through an opening in the side thereof for automatically engaging the said lever when moved into position to open the said valve for retaining it in position to hold the said valve in open position.

5. A cutting blow pipe or torch comprising in combination a hollow handle having an opening adjacent its forward end, a valve body having its rear end portion projecting into the forward end of said handle to close the latter, the said valve body having a passageway extending therethrough through which the oxidizing gas is adapted to pass forwardly to the tip of the blow pipe, a valve situated in the said passageway in advance of the forward end of the said handle, means for normally holding the said valve in closed position, a lever pivoted in advance of the said valve, said lever being situated exteriorly of the said handle and extending rearwardly and having the under side of its rear end portion projecting into the opening in said handle, the said lever being provided with an opening extending therethrough, means intermediate the said valve and the said lever whereby upon depression of the latter the said valve is opened, a catch which projects into and is adapted to extend through the opening in said lever, and means for causing the said catch to automatically engage the said lever when the latter is depressed to actuate the said valve.

6. A cutting blow pipe or torch comprising a handle, conduits for the gases, one of the said conduits constituting the passageway for the supply of the oxidizing gas to effect the cutting action, a valve situated forwardly and exteriorly of the said handle for controlling the passage of oxidizing gas through the said last mentioned conduit, means for holding the said valve in normally closed position, means situated exteriorly of the said handle for actuating the said valve into open position, means for automatically engaging the said second mentioned means to retain it in position to hold the said valve in open position, and means carried by the second named means for actuating the third mentioned means to cause it to engage the said second named means.

7. A cutting blow pipe or torch comprising in combination a hollow handle having an elongated slot adjacent its forward end, a valve body having a passageway therethrough, a conduit including said passageway for conveying the oxidizing gas to the tip of said blow pipe or torch for effecting the cutting action, a valve situated in said passageway exteriorly of the said handle for controlling the passage of gas through said passageway, means for normally holding the said valve in closed position, a lever having pivotal connection at its forward end with a projection extending forwardly from the said valve body, the said lever extending rearwardly and having the underside of its rear end portion extending into the said slot and the said lever having a rearwardly extending projection which extends underneath the inner side of said handle adjacent the rear end of the said slot and the said lever also having an opening extending therethrough, means intermediate the said lever and the said valve whereby pivotal movement of said lever effects and permits movement of the said valve, a bell crank catch lever pivoted upon the rear side of the said valve body and having one of its arms extending rearwardly and upwardly, the other arm of said bell crank catch lever extending upwardly through the said slot and through the opening in the valve actuating lever and being provided with a shoulder which is adapted to engage the said valve actuating lever adjacent the opening therethrough when said lever is depressed, and means intermediate the valve actuating lever and the bell crank catch lever for actuating the latter to cause it to engage the former upon the depression thereof.

8. In a blow pipe or torch, the combination of a tubular handle having an opening through its side adjacent an end thereof, an oxidizing gas conveying conduit extending through said handle, a valve for controlling the passage of gas through said conduit, means for holding said valve in closed position, a pivoted lever for actuating said valve to open the same, said lever being pivoted exteriorly of said handle and having its swinging end extended into said opening, and a catch pivotally supported within said handle and adapted to engage said lever and hold it in position to retain said valve in open position.

9. In a cutting blow pipe or torch, the combination of a conduit for the passage of an oxidizing gas, a valve for controlling the passage of gas through said conduit, a lever for actuating said valve, said lever being pivoted in advance of said valve and extending rearwardly to a point in rear thereof, means intermediate said lever and said valve whereby actuation of the former effects or permits actuation of the latter, means in rear of said intermediate means for engaging said lever and holding it to retain the said valve in open position, and means carried by the lever for causing the last mentioned means to engage said lever.

10. A blow pipe or torch comprising in combination, a hollow handle having an opening through the side thereof, an oxidizing gas conveying conduit which extends through the said handle, a valve situated within the said conduit for controlling the passage of gas therethrough, yielding means for holding the said valve in closed position, a lever pivoted exteriorly of the said handle and extending transversely of the direction of the opening and closing movements of the said valve, the swinging end of said lever extending into the opening through the side of said handle, and the said lever having an opening extending therethrough, means intermediate the said valve and the said lever whereby depression of said lever effects the opening of said valve, a catch lever pivotally supported within the said handle and projecting outwardly through the opening in the side of said handle and also through the opening in the said valve actuating lever, and a spring carried by said valve actuating lever for actuating the said catch lever to cause it to engage the said valve actuating lever when the latter is depressed to open the said valve to hold it in depressed position with the said valve in open position.

In testimony that I claim the foregoing as my invention I have hereunto signed my name this 11 day of March A. D. 1920.

ELOF H. MEDÉN.